Patented Mar. 16, 1926.

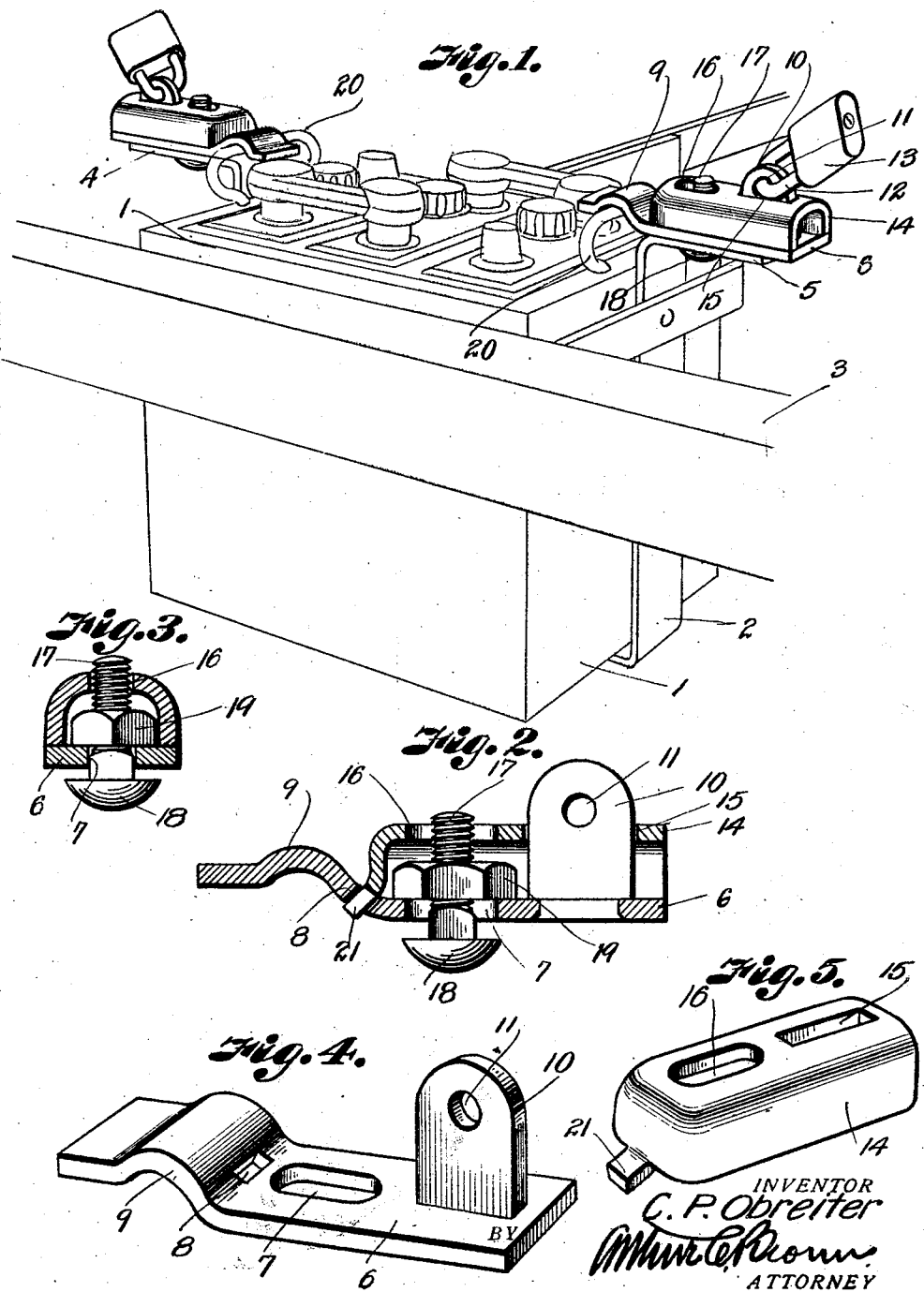

1,577,292

UNITED STATES PATENT OFFICE.

CLAUDE P. OBREITER, OF OKLAHOMA CITY, OKLAHOMA.

STORAGE-BATTERY THEFTPROOF LOCKING DEVICE.

Application filed January 15, 1925. Serial No. 2,576.

*To all whom it may concern:*

Be it known that I, CLAUDE P. OBREITER, a citizen of the United States, residing at Oklahoma City, in the county of Oklahoma and State of Oklahoma, have invented certain new and useful Improvements in Storage-Battery Theftproof Locking Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a storage battery theft-proof locking device and the primary object is to provide a locking means to prevent the surreptitious removal of a storage battery from its holder; the invention being particularly designed to be used in connection with motor vehicles.

It not infrequently happens that storage batteries are unlawfully removed from motor vehicles so my invention will prevent such occurrences.

In order to understand the purport of the invention as well as its novel details of construction, reference should be had to the accompanying drawings, in which Fig. 1 is a perspective view of a storage battery with the locking device applied.

Fig. 2 is a longitudinal, sectional view through the locking device.

Fig. 3 is a cross sectional view.

Fig. 4 is a detail perspective view of the locking clamp, and

Fig. 5 is a detail perspective view of the locking guard.

The storage battery 1, the holder 2 and the illustrated part 3 of the frame are all old and well known. The holder 2 is shown as provided with oppositely directed, outwardly disposed projections 4 and 5 to receive the locking bars 6. Each locking bar comprises a strip having an elongated slot 7 therein and an opening 8 adjacent to the bent-over portion 9 of the bar. Each bar is shown as having an upstanding lug or projection 10 with an opening 11 to receive the hasp 12 of a lock 13, illustrated as a padlock. The cover 14 is an enclosing device provided with an elongated slot 15 in its top and a similar elongated slot 16, the first slot being for the purpose of permitting the lug 10 to pass through the slot 15 and the second slot is to permit the threaded end 17 of a bolt 18 to pass through the cover. The bolt 18 is provided with a nut 19 by means of which the bolt 18 may fasten the locking plate 6 and the projection either 4 or 5 together. The bent-over portion 9 and its end constitute a retention finger adapted to engage over a handle or handles 20 of the storage battery box 1.

In applying the device the bar 6 is fastened to the part 4 or 5 (or both) of the holder, then the cover is applied by introducing the tongue 21 into the opening 8. The tongue extends downwardly and outwardly so that it engages the opening 8 in such a manner that it cannot be removed unless it is swung up, using the edge of the casing of which the tongue 21 is a part as a hinge. Therefore, when the enclosing cover 14 is in the position shown in Fig. 2 and the lock is applied, it is obvious that the cover cannot be taken off the bar and so long as the cover is locked to the bar, it will be impossible to turn the nut to remove the bolt to get off the bar 6. When the bar 6 is held in place, the retention finger bears down upon the handle of the storage battery box. Consequently the storage battery box cannot be removed.

It is obvious that the device may be readily applied to existing storage battery holders without altering the construction thereof and in actual practice it may not be necessary to have two locking devices as under certain conditions one will suffice.

What I claim and desire to secure by Letters-Patent is:

1. In combination with a storage battery and a battery holder, comprising a battery supporting strap having an angular projection at its upper end adjacent the top of the battery, a bar supported on said angular projection having a portion overlying the battery, the bar being provided with a slot and with a hasp lug, a bolt extending through said angular projection and through the bar slot, a nut on said bolt binding the bar to the projection, a housing enclosing the nut and having a slot for the hasp lug, and means co-operative with the lug to retain the housing on the bar.

2. In combination with a storage battery, a battery holder, comprising a battery supporting strap having right angular projections at its upper ends adjacent the top of the battery, slotted bars carried by the angular projections, each having a bolt slot and an upstanding hasp lug having an end portion extending over the battery to obstruct removal of the battery from its holder, a housing keyed to each of the said bars and having a slot through which the hasp lug of the underlying bar is projected, and a hasp member attached to said lug exterially of the housing for retaining the latter on its bar.

3. In combination with a storage battery having upstanding handles at its respective ends, a holder for the battery having angular projections adjacent the top of the battery, a bar on each of said projections having an inner end portion overlying the battery and comprising a transverse rib for engaging the battery handle, said bar having a longitudinal slot, an upstanding hasp lug and a latch aperture, a bolt extending through the angular projection of the handle strap and through the slot in the bar, a nut on said bolt overlying the bar, a housing for said nut, comprising a tongue engageable in the latch aperture of the bar and having a slot through which said hasp lug is projected, and a padlock having a hasp attached to the lug for locking the housing to said bar.

In testimony whereof I affix my signature.

CLAUDE P. OBREITER,